United States Patent [19]

Cole et al.

[11] Patent Number: 5,227,093

[45] Date of Patent: Jul. 13, 1993

[54] CURABLE ORGANOSILOXANE COMPOSITIONS YIELDING ELECTRICALLY CONDUCTIVE MATERIALS

[75] Inventors: Richard L. Cole, Bay City; Jean E. Fiori; Michael A. Lutz, both of Midland, all of Mich.

[73] Assignee: Dow Corning Corporation, Midland, Mich.

[21] Appl. No.: 800,298

[22] Filed: Nov. 29, 1991

[51] Int. Cl.$^5$ ............... H01B 1/00; H01B 1/04; H01B 1/14

[52] U.S. Cl. .................. 252/512; 252/514; 252/518; 252/520; 106/1.18; 106/1.19; 427/212; 427/215; 427/216; 528/10

[58] Field of Search ......... 252/518, 520, 514, 512; 106/1.18, 1.19; 427/212, 215, 216, 217; 528/10, 31, 33

[56] References Cited

U.S. PATENT DOCUMENTS

| | | | |
|---|---|---|---|
| 3,685,028 | 8/1972 | Wakabayashi et al. | 340/173 R |
| 3,918,984 | 11/1975 | High et al. | 106/404 |
| 4,695,404 | 9/1987 | Kwong | 252/514 |
| 4,766,176 | 8/1988 | Lee et al. | 525/100 |
| 4,777,205 | 10/1988 | LaScola et al. | 252/514 |
| 4,822,523 | 4/1989 | Prud'Homme | 252/512 |
| 4,833,033 | 5/1989 | Sannohe et al. | 252/518 |
| 4,888,216 | 12/1989 | Sannohe et al. | 252/520 |
| 5,015,413 | 5/1991 | Nagaoka | 252/512 |
| 5,158,708 | 10/1992 | Yamamoto et al. | 252/512 |

FOREIGN PATENT DOCUMENTS

| | | |
|---|---|---|
| 388473 | 3/1990 | European Pat. Off. . |
| 367562 | 5/1990 | European Pat. Off. . |
| 60-1222 | 1/1985 | Japan . |
| 63-161014 | 7/1988 | Japan . |
| 1-31874 | 2/1989 | Japan . |
| 1-153767 | 6/1989 | Japan . |
| 3/056581 | 7/1989 | Japan . |
| 1-189806 | 7/1989 | Japan . |

Primary Examiner—Paul Lieberman
Assistant Examiner—M. Kopec
Attorney, Agent, or Firm—Robert Spector

[57] ABSTRACT

The electrical conductivity of organosiloxane compositions containing high loadings of finely divided silver particles coated with an esterified fatty acid is superior relative to the conductivity of compositions containing silver particles that are either uncoated or coated with prior art treating agents, including free fatty acids.

9 Claims, No Drawings

CURABLE ORGANOSILOXANE COMPOSITIONS YIELDING ELECTRICALLY CONDUCTIVE MATERIALS

BACKGROUND OF THE INVENTION

1. Field of the Invention

This invention relates to curable organosiloxane compositions. More particularly, this invention relates to curable organosiloxane compositions containing finely divided silver particles that impart electrical conductance to cured materials prepared from these compositions. The silver particles contain a unique coating that not only increases the electrical conductivity of cured materials containing these particles relative to the values achieved using silver particles coated with known treating agents but also improves the ability of the materials to retain this conductivity during long term exposure to temperatures above 100° C.

2. Background Information

It is known to impart electrical conductivity to a variety of organic and organosilicon polymers by adding a finely divided electrically conductive material such as carbon black or silver to the polymer composition. It is also known to treat silver with organic fatty acids such as stearic acid to facilitate processing of the silver to form finely divided particles and blending large concentrations of the resultant particles into polymer compositions.

Japanese patent publication No. 60/1222, published on Jan. 7, 1985 describes electrically conductive pastes prepared by blending a liquid epoxide resin, dicyandiamide curing accelerators and reactive diluents with a particulate form of silver. The exemplified reactive diluent is the glycidyl ester of a fatty acid containing 14 carbon atoms.

Japanese Laid-Open Application No. 01/31874 teaches using a mixture containing 70 to 95 weight percent of silver flake having a diameter of from 1 to 10 microns and from 30 to 5 weight percent of a spherical silver powder having a diameter of from 0.1 to 0.5 micron together with finely divided silica in a conductive epoxy resin paste.

U.S. Pat. No. 4,695,404, issued on Sep. 22, 1987 describes polymeric compositions having a volume resistivity no higher than 0.1 milliohm-cm. The compositions comprise a polymer and from 70 to 90 weight percent, based on the weight of the composition, of silver flakes exhibiting a volume resistivity in the compressed state of no more than 0.2 milliohm-cm. The polymer can be an epoxy resin, silicone, fluorosilicone, polyurethane or long chain hydrocarbon.

Other polymer compositions containing silver as a conductive filler are described in published European Patent Application No. 367,562, published on May 9, 1990; European Patent Application No. 388,473; Japanese Laid Open Application No. 1/189,806; Japanese Laid Open Patent Application No. 1/153,767; Japanese Laid Open Patent Application No. 1/31,874; Japanese Laid Open Patent Application No. 63/161014; and U.S. Pat. No. 3,685,028.

Because solid silver particles typically provide higher electrical conductivity than an equal weight of silver coated particulates such as glass beads and fibers, the solid particles are usually preferred when it is desired to maximize electrical conductivity.

Finely divided solid silver particles are available as a spherical powder and in flake form. Because the inter-particle contact area of flakes is typically higher than that of powders, flakes are preferred in some applications.

Commercially available forms of silver flake typically contain a coating of a fatty acid as a processing aid. If the coating is not removed while the flake is being incorporated into a composition, the presence of the coating on the silver flake will reduce the electrical conductivity of the final composition. Because the fatty acid is polar and curable organosiloxane compositions are typically non-polar, the fatty acid coating tends to remain on the particles during preparation of the compositions and adversely affects the electrical conductivity of the cured material. The presence of the fatty acid may also interfere with curing of the organosiloxane composition.

While spherical silver particles without any coating are commercially available, these are difficult to disperse in organosiloxane compositions at the concentration required to achieve volume resistivity values less than 1 milliohm/cm following heat aging of the cured sample at temperatures of about 150 for at least two days.

An objective of this invention is to increase the electrical conductivity of elastomers, gels and resins prepared from curable organosiloxane compositions by increasing the concentration of finely divided silver particles that can be incorporated into the composition without increasing the viscosity of the composition to the extent that it is no longer suitable for the intended end use application, for example as a coating material or adhesive.

A second objective of the present invention is to provide silver-filled curable organosiloxane compositions that cure to yield electrically conductive gels, elastomers and resins which retain their initial level of electrical conductivity following long term exposure to elevated temperatures, typically 150° C. and above.

SUMMARY OF THE INVENTION

The objectives of the present invention are achieved by treating the finely divided silver particles used as the conductive filler in organosiloxane compositions with an ester of a fatty acid prior to incorporating the particles into the curable form of these compositions. The esters surprisingly do not interfere with curing of the composition and/or the electrical conductivity of the cured material as do the prior art free fatty acids.

Preferred compositions are curable by a platinum-catalyzed hydrosilylation reaction.

DETAILED DESCRIPTION OF THE INVENTION

This invention provides an improved curable organosiloxane composition exhibiting electrical conductivity in the cured form, said composition comprising the product obtained by blending to homogeneity a. an organopolysiloxane convertible to a cured material by reaction with a curing agent,
b. a curing agent in an amount sufficient to convert said organopolysiloxane to said cured material, and
c. an amount of finely divided silver particles sufficient to impart electrical conductivity to said cured material.

The improvement that characterizes the present curable compositions comprises the presence on the surface of the finely divided silver particles of a coating of an esterified fatty acid. This coating is typically applied before the silver particles are incorporated into the curable organosiloxane composition.

Esterified fatty acids that can be applied to the finely divided silver particles in accordance with the present invention are typically derived from saturated or ethylenically unsaturated carboxylic acids containing from 10 to 20 or more carbon atoms and alcohols containing from 1 to about 10 carbon atoms and at least one hydroxyl group. Suitable carboxylic acids include but are not limited to decanoic, dodecanoic, decenoic, stearic, palmitic, linoleic and oleic acids. The alcohol portion of the ester can be derived, for example, from methyl, ethyl, n-propyl, iso-propyl, or any of the isomeric butyl, hexyl, cyclohexyl, octyl or decyl alcohols. The methyl esters are particularly preferred.

Cured organosiloxane materials obtained using the present compositions include but are not limited to gels, elastomers and resins. To achieve the highest electrical conductivity in these materials, the concentration of silver particles in the curable composition should be the maximum that will allow the composition to be prepared and processed in the desired manner.

The present curable compositions typically contain up to about 80 weight percent of silver or silver-coated particles. Above about 80 weight percent the viscosity of the composition increases to the extent that it cannot be applied as a coherent coating, or fabricated using conventional techniques and equipment. The electrical conductivity of coatings and other cured articles prepared from curable compositions containing silver coated particles or less than about 70 weight percent of the solid silver particles may not be high enough for many applications.

The silver coated particles contain a surface layer of silver on a conductive or non-conductive substrate. Suitable substrates include but are not limited to metals such as copper and aluminum, and non-metallic materials such as glass and organic polymers.

To achieve maximum electrical conductivity the diameter of the silver particles is preferably in the range from 0.5 to about 100 micrometers.

Particulate forms of solid silver are typically obtained from the chemical or electrochemical reduction of a silver compound such as silver nitrate When finely divided solid silver particles are used as the conductive filler, the prarticles can be essentially spheroidal or elongated. In a preferred embodiment the particles of powder have been processed in a ball mill or similar device to form flakes.

To provide a low level of volume resistivity, one means for expressing electrical conductivity, the volume resistivity of the silver particles should preferably be less than 0.2 milliohm-cm. Volume resistivity ($R_v$), typically expressed in ohm-cm, is calculated using the formula $R_v = R[(wt)/1]$, where R is the electrical resistance of the sample in ohms measured using an ohmmeter or equivalent resistance measuring device, w and t are the width and thickness of the sample, in centimeters, and 1 is the distance in centimeters between the electrical conductors of the resistance measuring device.

The distinguishing feature of the present compositions is the presence of a coating of an esterified fatty acid on the surface of the silver particles. The coating can be applied using the same techniques used to apply prior art coatings of free fatty acids and other materials to silver articles. When the particles are in the form of flakes formed by ball milling, the coating of esterified fatty acid can be applied during the ball milling operation.

The Curable Organosiloxane Composition

The Organopolysiloxane (Ingredient A)

The major organosilicon ingredient in a typical curable organosiloxane composition is a curable organopolysiloxane, referred to hereinafter as ingredient A. Depending upon the degree of polymerization, the viscosity of ingredient A can range from a pourable liquid to a stiff gel, gum or resin that will not flow under the influence of gravity. The type of organopolysiloxane selected will depend upon the desired processing and curing conditions in addition to the physical properties desired in the cured material.

The repeating units present in ingredient A can be one or more of $RSiO_{3/2}$, $R_2SiO$ and $R_3SiO_{\frac{1}{2}}$, where R represents an unsubstituted or substituted monovalent hydrocarbon radical. This ingredient can also contain up to about 50 mol percent of $SiO_{4/2}$ units.

If the cured material is a gel or an elastomer, the ingredient A typically contains an average of from 1.8 to 2.2 hydrocarbon radicals per silicon atom. Diorganopolysiloxanes are preferred for this application.

If a higher degree of crosslinking is desired in the final cured product, the average number of hydrocarbon radicals on silicon atoms of ingredient A approaches 1.

The organic groups bonded to the silicon atoms of the ingredient A, represented by R in the foregoing formulae for the repeating units, are typically monovalent hydrocarbon or halogenated hydrocarbon radicals. The hydrocarbon radicals contain from 1 to 10 or more carbon atoms. These hydrocarbon radicals can be alkyl such as methyl and ethyl, alkenyl such as vinyl, allyl, and 5-hexenyl, cycloalkyl such as cyclohexyl, aryl such as phenyl, alkaryl such as tolyl and aralkyl such as benzyl. Examples of halogenated hydrocarbon radicals include but are not limited to chloromethyl and 3,3,3-trifluoropropyl.

Preferably at least 50 percent of the organic groups present in ingredient A are methyl, and any remainder are phenyl, 3,3,3-trifluoropropyl, and alkenyl.

Curable organosiloxane compositions containing a variety of reactive groups are known in the art. The types of reactive groups present on ingredient A is determined by the reaction used to cure the composition. When the composition cures by a chemical reaction initiated in the absence of radiation or other free radical generator, the reactive groups are typically hydroxyl groups, alkoxy groups or alkenyl radicals, and are typically located on the terminal silicon atoms of each molecule of ingredient A.

If the composition is curable in the presence of atmospheric moisture ingredient A is typically a diorganopolysiloxane containing silicon-bonded hydroxyl groups, also referred to as silanol groups.

The Curing Agent (Ingredient B)

Ingredient B is a free radical source or an organosilicon compound containing at least two silicon-bonded groups that react with groups present on ingredient A during curing of the present compositions. The type of reactive groups on ingredient B are determined by the conditions under which the composition is cured.

For moisture curable compositions the groups present on ingredient B are typically alkoxy, acetoxy, aminoxy, amido or ketoximo. These groups hydrolyze in the presence of atmospheric moisture to yield silanol groups. A curing catalyst such as a metal salt of a carboxylic acid or an organotitanate can also be present in these compositions.

Another class of curable organosiloxane compositions employs the reaction of silanol groups on ingredient A with silicon-bonded hydrogen atoms present in ingredient B to form cured materials. This reaction can be catalyzed by metal salts of carboxylic acids.

Curing of compositions by a free radical mechanism can be achieved by the action of ultraviolet radiation on a suitable photolytically activated free radical source such as an azo compound or by heating compositions containing an organic peroxide to a temperature above the decomposition temperature of the organic peroxide. Because silver has been shown to inhibit or deactivate curing by organic peroxides, organic peroxides may not be suitable curing agents for the present compositions.

A preferred class of the present organosiloxane compositions cures by a platinum-catalyzed hydrosilylation reaction. These compositions typically include, as a minimum, an organopolysiloxane (ingredient A) containing at least two alkenyl radicals such as vinyl per molecule, as ingredient B an organohydrogenpolysiloxane containing an average of at least two silicon-bonded hydrogen atoms per molecule and platinum metal or a platinum compound as the hydrosilylation or curing catalyst.

If it is desired to form a crosslinked product the sum of the average numbers of ethylenically unsaturated hydrocarbon radicals per molecule of organopolysiloxane and silicon-bonded hydrogen atoms per molecule of organohydrogenpolysiloxane should be greater than 4.

Because compositions curable by a platinum-catalyzed hydrosilylation reaction may begin to cure even under ambient conditions once all the reactants and the catalyst have been combined, the curable compositions often contain a platinum catalyst inhibitor to increase the working time and/or storage stability of the composition. Depending upon the end use and desired physical properties to be exhibited by the cured material, the curable compositions may also contain a reinforcing filler such as finely divided silica.

The hydrosilylation reaction may begin once the organopolysiloxane, curing agent and platinum-containing catalyst have been combined, even in the presence of a platinum catalyst inhibitor. For this reason it may be desireable to package this type of curable organosiloxane composition in at least two containers. The organohydrogenpolysiloxane and platinum-containing hydrosilylation catalyst are in separate containers.

A second method for avoiding premature curing of the compositions using a hydrosilylation reaction is to encapsulate the curing catalyst in finely divided particles of a thermoplastic or thermosetting organic resin or a silicone resin. Curable organosiloxane compositions containing microencapsulated platinum-containing hydrosilylation catalysts are described in U.S. Pat. No. 4,766,176, which issued on Aug. 23, 1988. The disclosure of this patent is hereby incorporated into this specification in its entirety.

Optional Ingredients

The present compositions can contain additional ingredients to improve the processability of the curable composition or the properties of cured materials prepared from these compositions. Typical additional ingredients include but are not limited to reinforcing fillers such as finely divided silica, non-reinforcing fillers, filler treating agents, adhesion promoters, flame retarding agents, heat stabilizers, pigments and dyes.

Preparation of Curable Compositions

The curable compositions of this invention are prepared by any suitable means that will produce a homogeneous mixture of the ingredients, particularly the silver particles. Blending equipment commonly used to prepare organosiloxane compositions include but are not limited to blade and paddle mixers, dough-type or sigma-blade mixers, planetary mixers, Banbury mixers and rubber compounding mills.

The order in which the ingredients are added to the mixer is usually not critical. In a typical preparation the polydiorganosiloxane, at least a portion of the silver-containing particles, fillers and any optional additives are blended to homogeneity, after which the curing agent together with any additional silver are added and the mixing operation is continued at room temperature until a homogeneous composition is produced. In preferred compositions ingredients A and B are liquids.

The electrically conductive organosiloxane compositions of the present invention are useful as coating materials and as the starting material for preparing elastomeric and rigid shaped articles. Typical applications include but not limited to electrically conductive adhesives and coatings for electrical and electronic devices.

EXAMPLES

The following examples describe preferred curable compositions of this invention, and should not be interpreted as limiting the scope of this invention as defined in the accompanying claims. Unless otherwise specified, all parts and percentages are by weight. Viscosities and physical properties of the cured compositions other than conductivity were measured at 25° C.

The three types of finely divided silver particles used as the conductive filler in the compositions described in the examples were obtained from a single supplier and ranged from in size from 0.5 to 10 microns, measured using ASTM test procedure no. B330-65. The apparent density of the particles was from 5 to 40 g. per cubic inch, measured in accordance with ASTM test procedure B329-70.

One of the three types of silver particles was coated by the supplier with methyl oleate, an esterified fatty acid ester of this invention, using conventional techniques to form a continuous coating on the particles (type A).

A second type of particle was coated by the supplier with an unesterified fatty acid, a prior art coating material (type B). The curable composition containing this type of particle was used for comparative purposes.

A third type of silver particle was not treated (type C), and was used to prepare a second comparative composition.

The compositions containing the particles identified as types B and C are outside the scope of the present invention and were evaluated for comparative purposes.

Resistance measurements were obtained using samples that had been cured for 2 hours at 150° C. in cylindrical gold-plated containers using a gold conductor located in the center of the container as one electrode and the wall of the container as the second electrode.

EXAMPLE 1

Curable organosiloxane compositions were prepared by blending the following ingredients to homogeneity:

197.5 parts of a dimethylvinylsiloxy-terminated polydimethylsiloxane having a viscosity of about 0.4 Pa.s at 25° C., 2.1 part of the reaction product of hexachloroplatinic acid and sym-tetramethyldivinyldisiloxane that had been diluted with a liquid dimethylvinylsiloxy terminated polydimethylsiloxane in an amount sufficient to achieve a platinum content of 0.7 weight percent, 1.9 parts of a trimethylsiloxy-terminated polydiorganosiloxane containing an average of five methylhydrogensiloxane units and three dimethylsiloxane units per molecule with a silicon-bonded hydrogen atom content in the range from about 0.7 to 0.8 weight percent, and 0.9 parts of cyclic methylvinylsiloxanes as a catalyst inhibitor.

Type A, B or C silver particles were blended into the composition at the concentration level (in weight percent) listed in Table 1. The composition of this invention containing 70 weight percent of the fatty acid ester-coated silver particles and the comparison example containing uncoated silver particles exhibited equivalent viscosity values.

Measurement of Volume Resistivity

The test samples for volume resistivity determinations were prepared by filling a ceramic container with a curable composition that had been previously deaired. The composition was then cured by placing the filled container for two hours in an oven maintained at a temperature of 150° C. After the cured samples cooled to ambient temperature the resistance (R) across a one inch (2.5 cm.) length of each sample was read directly using a microohmmeter. The volume resistivity (Rv) of the sample was then calculated using the formula Rv(ohm-cm)=[R(ohms)× 1 cm2 (cross-sectional area)]/2.5 cm (length of current path)

The volume resistivity values for samples containing the three different types of silver particles are recorded in Table 1.

TABLE 1

| Silver | | R | Volume Resistivity |
|---|---|---|---|
| Coating | Wt. % | (ohms) | (milliohms-cm) |
| Ester (A) | 70.0 | 0.020 | 1.3 |
| Acid (B) | 70.0 | N.R. | — |
| None (C) | 50.0 | 0.088 | 7.7 |

Note: N.R. = The current through the sample was too low for an ohmmeter reading

EXAMPLE 2

This example demonstrates the ability of cured compositions containing silver particles with a coating of a fatty acid ester to retain their low values of electrical resistance following long-term exposure to a temperature of 105° C. A composition containing uncoated silver particles is used for purposes of comparison.

Curable compositions were prepared using the same types and relative amounts of ingredients described in example 1, with the exception that the type A silver particles containing a coating of methyl oleate, a fatty acid ester of this invention referred to as "ester" in Table 2, were used at a concentration of 79.96 percent, based on the total weight of the composition.

The composition prepared for comparative purposes contained 60.02 weight percent, based on the weight of the curable composition, of uncoated silver particles.

The viscosities of the two coating compositions were equal.

Test samples of cured materials were prepared by placing the curable compositions in a mold measuring 1.25×0.75×0.06 inch (3.2×1.9×0.15 cm) and heating the compositions for 2 hours at a temperature of 150° C.

The resistance of the test samples prepared using the composition of the present invention and the composition containing untreated silver particles were measured by clamping the test samples between two gold plated aluminum strips measuring 1×3 inches (2.5×7.6 cm). The resistance of the samples was measured with an microohmmeter using the gold plated strips as electrodes.

Following measurement of the initial resistance value the test samples were placed in an oven maintained at a temperature of 105° C. for a total time of 384 hours. The samples were withdrawn at the time intervals listed in Table 2 and the resistance measurement was repeated. The resistance values together with the exposure time of the two samples are recorded in Table 2.

TABLE 2

| | Resistance (Milliohms) Following Exposure Time of n Hours To 105° C. (Hours); n = | | | | | | | | | |
|---|---|---|---|---|---|---|---|---|---|---|
| Coating | 0 | 17 | 39 | 61 | 89 | 107 | 131 | 203 | 290 | 384 |
| Ester | 1.1 | 1.0 | 0.8 | 1.3 | 1.2 | 1.5 | 0.8 | 2.6 | 1500 | 1200 |
| None | 0.4 | 0.6 | 0.7 | 12 | 10 | 10 | 7 | 140 | 260 | 16 |

The data in Table 2 demonstrate that the sample containing the silver particles treated with the methyl ester of a fatty acid retained its initial low resistance value for about 203 hours at 105° C. The resistance of the sample prepared using untreated silver particles increased to more than ten times its initial value following a 61 hour exposure to the same temperature.

EXAMPLE 3

This example demonstrates the use of a composition of this invention as an adhesive.

A curable composition of this invention and two comparative compositions were prepared by blending the following ingredients to homogeneity.

6.13 parts of a liquid dimethylvinylsiloxy-terminated organosiloxane copolymer containing an average of 150 phenylmethylsiloxane units and 350 dimethylsiloxane units per molecule, 0.2 parts of a reaction product of hexachloroplatinic acid and sym-tetramethyldivinyldisiloxane that had been diluted with a liquid dimethylvinylsiloxy terminated polydimethylsiloxane in an amount sufficient to achieve a platinum content of 0.7 weight percent a mixture of 0.19 part of a liquid hydroxyl terminated polymethylvinylsiloxane containing about 4 weight percent of silicon-bonded hydroxyl groups and 0.19 part of glycidoxypropyltrimethoxysilane; the mixture had been heated for 168 hours at 70° C. at which time the volatile materials were removed by heating at 70° C. under a pressure of 20 mm. of mercury, 0.79 parts of a trimethylsiloxy-terminated polydiorganosiloxane containing an average of five methylhydrogensiloxane units and three dimethylsiloxane units per molecule with a silicon-bonded hydrogen atom content of about 0.7 weight percent, and one of the following 3 types and amounts of silver particles described in the preceding Example 1:

77.3 weight percent (based on weight of curable composition) of fatty acid ester coated silver particles (Type A)

73.9 weight percent of fatty acid coated silver particles (Type B)

63.4 weight percent of uncoated silver particles (Type C)

The viscosities of the three compositions were measured using a Brookfield type DV-II cone and plate type viscometer equipped with a #52 spindle rotating at a speed of 0.5 RPM. The viscosity values were A=2600 poise, B=2080 poise and C=4520 poise.

Test samples for volume resistivity measurements were prepared by placing 2 parallel strips of 3M Miracle Scotch Tape(R) along a 3 inch (7.6 cm.) length of a glass microscope slide. The strips were placed 0.125 inch (0.32 cm) apart. A portion of the curable composition to be evaluated was placed at one end of the area between the two tape strips and coated over this area by drawing a razor blade held at an angle of 45 degrees over the two strips of tape to distribute the composition evenly into the area between the strips in the form of a continuous coating having a thickness approximately equal to that of the tape strips (0.002 inch, 0.005 cm). The tape strips were then removed and the coating cured by placing the coated slide for two hours in a forced air circulation oven maintained at a temperature of 150° C.

The electrical resistance of the cured coating was measured using a microohmmeter and a current of about 1 milliampere. The electrodes of the microohmmeter were spaced 1.0 inch (2.54 cm) apart.

The volume resistivity (Rv) of the samples was calculated as described in Example 1 of this specification using the formula Rv(ohm-cm)=[(R) (0.32 cm) (0.005 cm)]/[2.54 cm].

The volume resistivity values recorded in Table 3 represent an average of 6 samples.

The effect of heat exposure on the volume resistivity was determined by placing the test samples for 63 hours in an oven maintained at a temperature of 150° C. and repeating the resistance measurement.

The adhesion of the cured material to aluminum was determined using lap shear measurements. Two strips measuring 1 by 3 inches (2.5 by 7.5 cm) and formed from Alclad(R) ® type 2024T3 aluminum were cleaned using isopropyl alcohol followed by acetone, and were then dried by exposing them to a temperature of 150° C. for about 20 hours. The strips were then placed in a jig that maintained the strips in a collinear configuration with a one inch overlap. The composition to be evaluated was coated over the mating surfaces of the strips so as to cover the entire area of the overlap with a 0.025 in (0.064 cm)-thick layer of material. The compositions were cured by placing the jig for two hours in a circulating air oven maintained at a temperature of 150° C. The test samples were allowed to cool for a minimum of four hours before being tested for adhesive strength by pulling the samples apart using a force applied in the same plane as the longitudinal axis of the test samples. The percent cohesive failure (failure within the body of the cured material rather than at the boundary between the cured material and the metal strip) that occurred was also noted.

The initial volume resistivity value and the value following heat aging of the sample together with the lap shear values and percent cohesive failure for the one sample of this invention (A) and the two comparative samples (B and C) are recorded in Table 3.

TABLE 3

| Sample | Volume Resistivity (milliohm-cm) | | Lap Shear psi(MPa) | % Cohesive Failure |
|---|---|---|---|---|
| | Initial | Heat Aged | | |
| A | 0.453 | 0.858 | 235 (16.2) | 100 |
| B | N.R. | N.R. | 260 (17.9) | 96 |
| C | 0.893 | 1.05 | 225 (15.5) | 100 |

N.R. = Insufficient current flow for a resistivity calculation

EXAMPLE 4

This example describes a preferred form of silver particle in the form of a flake in combination with a microencapsulated platinum-containing hydrosilylation catalyst.

Curable compositions were prepared by blending the following ingredients to homogeneity.

4.13 parts of a liquid dimethylvinylsiloxy-terminated organosiloxane copolymer containing an average of 150 phenylmethylsiloxane units and 350 dimethylsiloxane units per molecule, 0.76 parts of a mixture containing equal weights of part of a liquid hydroxyl terminated polymethylvinylsiloxane containing about 4 weight percent of silicon-bonded hydroxyl groups and glycidoxypropyltrimethoxysilane; the mixture had been heated for 168 hours at 70° C. at which time the volatile materials were removed by heated at 70° C. under a pressure of 20 mm. of mercury;

as the curing agent for the composition, 1.58 parts of a trimethylsiloxy-terminated polydiorganosiloxane containing an average of five methylhydrogensiloxane units and three dimethylsiloxane units per molecule with a silicon-bonded hydrogen atom content of about 0.7 weight percent;

as the curing catalyst, 1.73 parts of a 10 weight percent slurry of a microencapsulated platinum-containing hydrosilylation reaction catalyst; the microencapsulating material was a resinous organosiloxane copolymer containing 78 weight percent of monophenylsiloxane units and 22 weight percent of dimethylsiloxane units; the catalyst was an isopropanol solution of the reaction product of chloroplatinic acid and symtetramethyldivinyldisiloxane, and the microcapsules contained 0.04 weight percent of platinum; and 33.3 parts of a flake form of silver that had been prepared by processing silver particles treated first with a fatty acid and ball milled in the presence of methyl oleate in a ball mill. The diameters of the particles ranged from about 0.1 to about 25 microns.

The viscosity of the curable organosiloxane composition was 14.5 poise using the viscometer and spindle described in example 3 of this specification and a spindle speed of 1 RPM.

The composition was cured and the volume resistivity and lap shear measured as described in Example 3 of this specification. The results of these measurements are recorded in Table 4.

TABLE 4

| Volume Resistivity (milliohm-cm) | | Lap Shear | |
|---|---|---|---|
| Initial | Heat Aged | psi(MPa) | % Cohesive Failure |
| 0.216 | 0.240 | 200(13.8) | 98 |

That which is claimed is:

1. In an improved curable organosiloxane composition exhibiting electrical conductivity in the cured form, said composition comprising the product obtained by blending to homogeneity
   a. an organopolysiloxane convertible to a cured material by reaction with a curing agent,
   b. a curing agent in an amount sufficient to convert said organopolysiloxane to said cured material, and
   c. an amount of finely divided silver particles sufficient to impart electrical conductivity to said cured material,
the improvement comprising the presence on the surface of said silver particles of a coating of at least one esterified fatty acid.

2. A composition according to claim 1 where the concentration of said silver particles is up to 80 weight percent, based on the weight of said composition, the volume resistivity of said silver particles does not exceed 0.2 milliohm-cm, said silver particles are in the form of powder or flakes, and said fatty acid ester is derived from a mono- or dicarboxylic acid containing from 10 to 20 carbon atoms and an alcohol containing from 1 to 10 carbon atoms and at least one hydroxyl group.

3. A composition according to claim 2 where said ester is selected from the group consisting of methyl esters of decanoic, dodecanoic, decenoic, stearic, palmitic, linoleic and oleic acid and the concentration of said silver particles is from 70 to 80 percent, based on the weight of said composition.

4. A composition according to claim 1 where the repeating units of said organopolysiloxane are selected from the group consisting of $RSiO_{3/2}$, $R_2SiO$ and $R_3SiO_{1/2}$, where R represents an unsubstituted or substituted monovalent hydrocarbon radical, and up to 50 mol percent, based on the total of said units, of $SiO_{4/2}$ units 5. A composition according to claim 4 where said composition is curable in the presence of atmospheric moisture and contains a silanol-terminated diorganopolysiloxane and, as the curing agent, an organosilicon compound containing an average of more than 2 groups that hydrolyze in the presence of atmospheric moisture to form silanol groups.

6. A composition according to claim 4 where said composition cures by a hydrosilylation reaction in the presence of a platinum-containing catalyst, the organopolysiloxane contains at least two alkenyl radicals per molecule, the curing agent is an organohydrogensiloxane containing an average of at least two silicon-bonded hydrogen atoms per molecule, and the sum of the number of alkenyl radicals per molecule of organopolysiloxane and silicon-bonded hydrogen atoms per molecule of organohydrogensiloxane is greater than four.

7. A composition according to claim 6 where said composition in packaged in at least two containers, with said organohydrogenpolysiloxane and said platinum-containing catalyst located in different containers.

8. A composition according to claim 6, where said composition is packaged in a single container and said platinum-containing catalyst is microencapsulated in particles of a thermoplastic or thermosetting organic polymer or a silicone resin.

9. A composition according to claim 1, where said organopolysiloxane and curing agent are liquids.

* * * * *